No. 615,680. Patented Dec. 13, 1898.
M. N. CORMACK.
LAWN MOWER.
(Application filed Dec. 2, 1897.)
(No Model.) 2 Sheets—Sheet 1.

WITNESSES: INVENTOR
M. N. Cormack
BY
ATTORNEYS.

No. 615,680. Patented Dec. 13, 1898.
M. N. CORMACK.
LAWN MOWER.
(Application filed Dec. 2, 1897.)
(No Model.) 2 Sheets—Sheet 2.
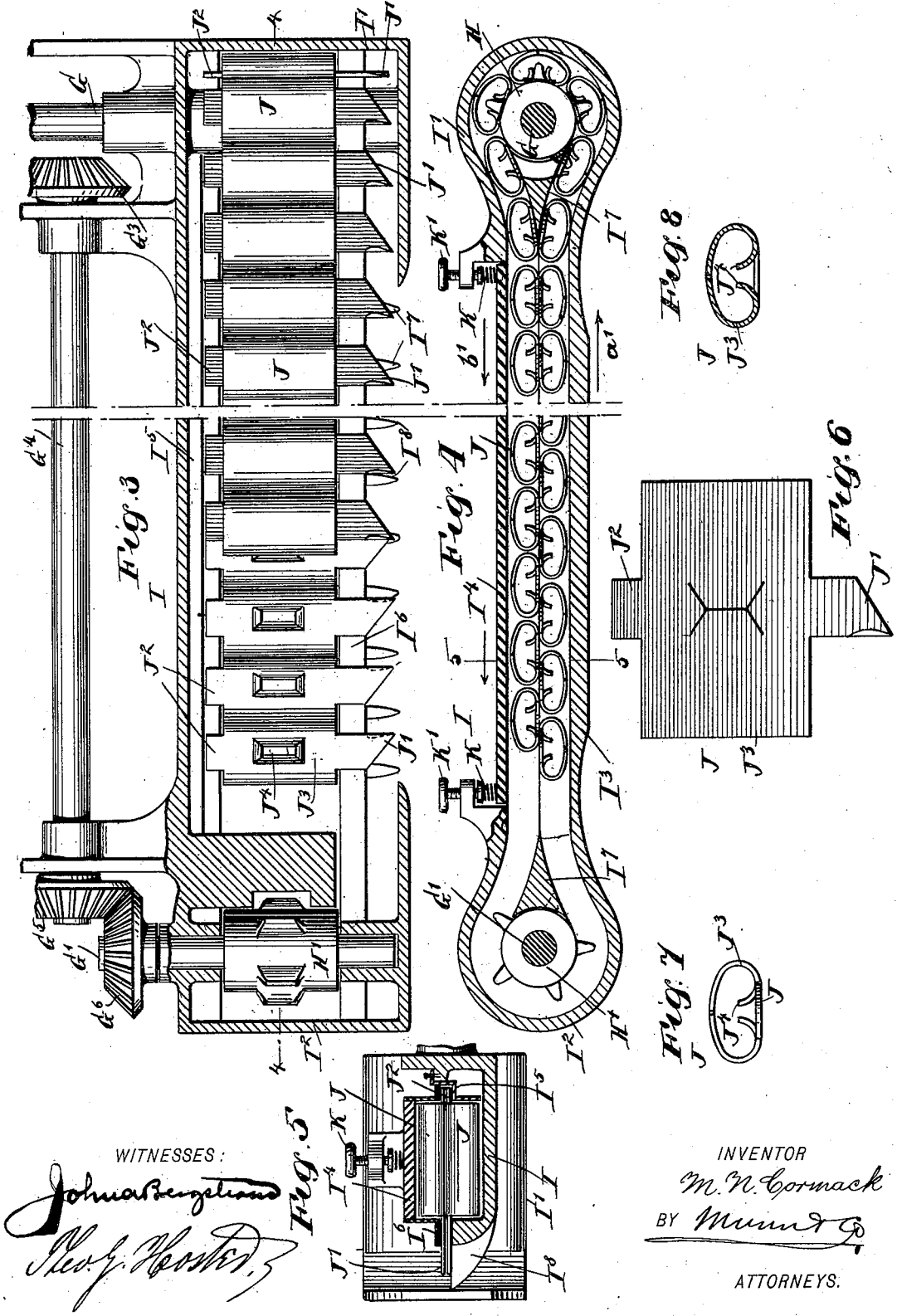
WITNESSES:
INVENTOR
M. N. Cormack
BY Munn & Co
ATTORNEYS.

UNITED STATES PATENT OFFICE.

MARK N. CORMACK, OF NEW YORK, N. Y.

LAWN-MOWER.

SPECIFICATION forming part of Letters Patent No. 615,680, dated December 13, 1898.

Application filed December 2, 1897. Serial No. 660,540. (No model.)

*To all whom it may concern:*

Be it known that I, MARK N. CORMACK, of New York, (Jamaica,) in the county of Queens and State of New York, have invented a new and Improved Lawn-Mower, of which the following is a full, clear, and exact description.

The object of the invention is to provide a new and improved lawn-mower which is simple and durable in construction and arranged to cut grass of any height with great ease and accuracy and without danger of clogging up the machine, as is so frequently the case with lawn-mowers as at present constructed.

The invention consists of novel features and parts and combinations of the same, as will be hereinafter more fully described, and pointed out in the claims.

Reference is to be had to the accompanying drawings, forming a part of this specification, in which similar characters of reference indicate corresponding parts in all the figures.

Figure 1:
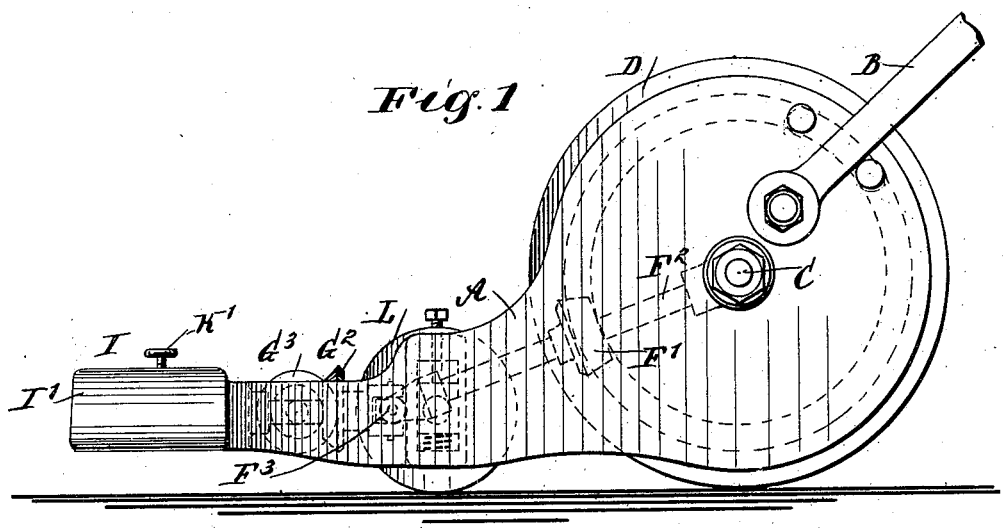
Figure 2:
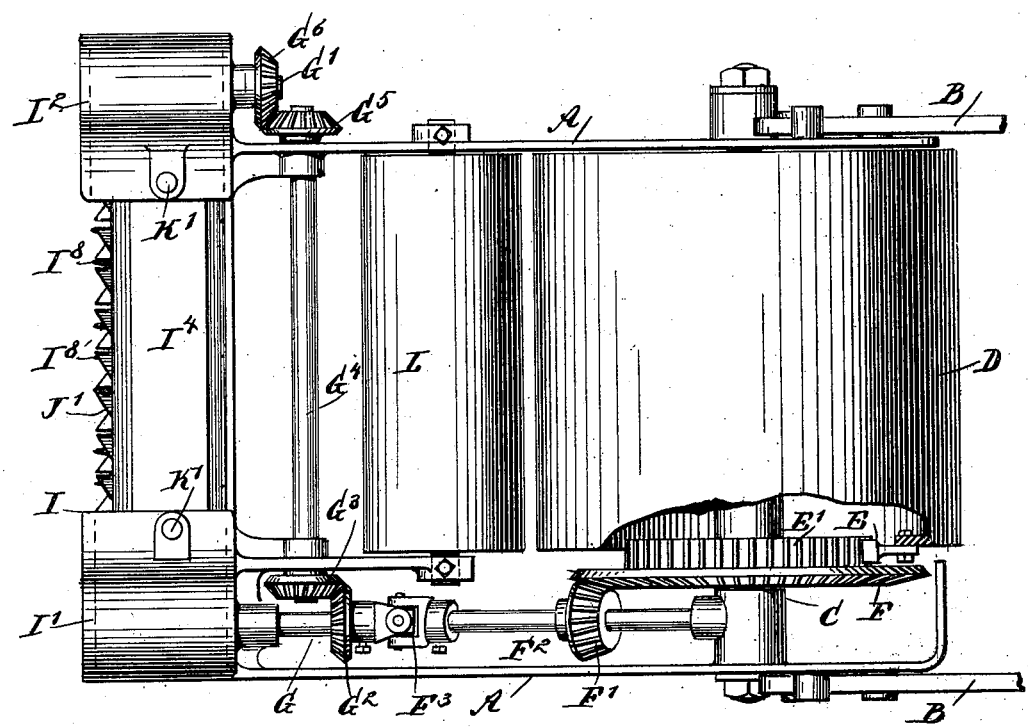

Figure 1 is a side elevation of the improvement. Fig. 2 is a plan view of the same with parts in section. Fig. 3 is an enlarged sectional plan view of the cutting portion of the improvement. Fig. 4 is a sectional front elevation of the same on the line 4 4 of Fig. 3. Fig. 5 is a sectional side elevation of the same on the line 5 5 of Fig. 4. Fig. 6 is a plan view of the blank for forming a cutter. Fig. 7 is a front elevation of a cutter, and Fig. 8 is a sectional front view of the same.

The improved lawn-mower is mounted in a suitably-constructed frame A, provided with a handle B for pushing the machine over the ground, and in the frame A, near the upper end thereof, is secured a shaft C, on which is mounted to turn a roller or drive-wheel D, connected by a pawl E and ratchet-wheel E' with a bevel gear-wheel F, mounted to rotate loosely on the shaft C. Thus on the forward motion of the machine the drive-wheel D imparts a rotary motion to the gear-wheel F, and on the backward motion of the machine the gear-wheel F remains stationary and the pawl E glides over the teeth of the ratchet-wheel E'.

The bevel gear-wheel F is in mesh with a pinion F', secured on a shaft F², journaled at one end in a suitable bearing on the frame A, the other end being connected by a universal joint F³ with a shaft G, journaled in suitable bearings in the forward part of the frame A at one side thereof, as is plainly indicated in the drawings, the said shaft carrying a sprocket-wheel H, mounted to turn in a casing I, forming an endless path or track for individual cutters J to travel in, the said cutters being formed with forwardly-projecting knives J', extending with their cutting edges beyond the front of the casing I to cut the grass, as hereinafter more fully described.

The part I' in which the sprocket-wheel H is arranged is made cylindrical, and a similar cylindrical part I² is formed on the casing I at the opposite end, and in this part is mounted to turn a second sprocket-wheel H', secured on a shaft G', driven from the shaft G, so that the two sprocket-wheels H H' revolve in unison. For this purpose the shaft G is provided with a bevel gear-wheel G² (see Fig. 2) in mesh with a bevel gear-wheel G³, secured on one end of a transversely-extending shaft G⁴, journaled in suitable bearings in the frame A, the said shaft carrying at its other end a bevel gear-wheel G⁵ in mesh with a bevel gear-wheel G⁶ on the shaft G', previously mentioned.

The middle portion I³ of the casing I is arranged in such a manner that the cutters J, which travel in an endless string one behind the other in the endless path, are caused to come with their cutting edges over each other, so as to produce a shear cut when the machine is used, it being understood that the lower run of the cutters J travel through the casing in the direction of the arrow $a'$, while the other or top run of the cutters travel in the direction of the arrow $b'$—that is, in an inverse direction to the travel of the lower run of cutters.

In order to hold the cutters in proper position while passing through the middle portion I³ of the casing I, I arrange the top plate I⁴ thereof yieldingly by employing springs K, pressing on the said plate to hold the side flanges of the plate in contact with the flanges of the upper run of cutters. (See Fig. 4.) The tension of the springs K can be adjusted by screws K'.

The cutters J are separate from each other, their ends, however, abutting one upon the other, as is plainly indicated in the drawings, to insure a proper traveling of the cutters in the endless path in the casing. Each cutter J is for this purpose provided with a body portion $J^3$, formed integral with a knife-blade $J'$ and a guide-flange $J^2$, extending from the main portion directly opposite the knife-blade, the guide-flange $J^2$, as well as a portion of the knife-blade $J'$, being mounted to swing in guideways $I^5 I^6$, respectively, formed in the casing I. The body portion $J^3$ is struck up in the form of a vertically-disposed link by bending the ends of the blank arch shape until the ends meet, as will be readily understood by reference to Figs. 7 and 8, and in the bottom of this link are formed struck-up flanges $J^4$, adapted to be engaged by the teeth of the sprocket-wheels H H', so that the said teeth propel the individual cutters along when coming in contact with the teeth in the ends of the casing. Thus one cutter-body portion $J^3$ is forced against the one in advance by the action of the sprocket-wheels H H', so that the cutters are caused to travel in the endless path of the casing, the knife-blades shearing over each other at the front end of the casing, so as to cut the grass evenly and with great rapidity and without strain irrespective of the height of the grass.

In order to insure a proper traveling of the cutters from the cylindrical ends $I' I^2$ of the casing toward or from the middle portion $I^3$ thereof, I provide ribs $I^7$ for properly guiding the cutters from and to the wheels H H', as will be readily understood by reference to Fig. 4.

The casing I is provided at its forward end with the usual forwardly-projecting fingers $I^8$ for protecting the cutters from stones, &c.

The end portions $I' I^2$ of the casing I are preferably closed at their front to prevent grass from passing into the said ends and clogging up the wheels and cutters.

Having thus fully described my invention, I claim as new and desire to secure by Letters Patent—

1. A lawn-mower having a frame, a casing mounted on the frame, a sprocket-wheel mounted in each end of the casing, an endless line of cutters movable in the casing and driven by the sprocket-wheels, a top plate forming part of the casing and movable independently thereof, springs pressing the top plate against the top line of cutters, and set-screws held on the casing and bearing respectively against the springs to sustain the same.

2. A lawn-mower having individual cutters arranged to be driven in a continuous path, each cutter being formed of a plate provided at one edge with a guide-flange and at the opposite edge with a knife-blade, the plate having its ends bent up into proximity with each other, and having flanges struck up from an intermediate point on the plate to form an orifice in the plate for engagement with a sprocket-wheel.

3. A lawn-mower having a frame, a casing carried on the frame, a series of cutters mounted in the casing, means for driving the cutters in a continuous endless line, a top plate forming part of the casing and movable independently thereof and bearing down on the cutters, a spring pressing the top plate, and a set-screw carried on the casing and engaging the spring to sustain the same.

4. A mower provided with a series of separate individual cutters adapted to travel in a continuous endless line and being disposed in two oppositely-moving runs, one above the other and in direct contact with each other, so that the edges of the cutters move directly past each other to perform the cutting, and means for carrying and driving the cutters.

5. A lawn-mower having a casing, the middle portion of which is contracted to form a narrow passage, a sprocket-wheel mounted in one end of the casing, and an endless line of separate individual cutters mounted in the casing to travel continuously therein, the cutters at the middle portion or said narrow passage of the casing being disposed in two runs, one above the other and in direct contact with each other, so that the edges of the oppositely-moving cutters will coact to perform the cut.

6. A lawn-mower having a casing, provided with a contracted midddle portion and with enlarged end portions, a sprocket-wheel mounted in each end portion of the casing, a rib fitted in each end portion of the casing respectively adjacent to the sprocket-wheels, and a series of separate individual cutters mounted in the casing to move in a continuous endless line, and being driven by the sprocket-wheels, the cutters at the middle of the casing being disposed in two oppositely-moving parallel runs arranged in direct contact with each other, so that the edges of the cutters will move past each other and operate jointly to perform the cut.

7. A lawn-mower having a casing, the middle portion of which is contracted to form a narrow passage, and the end portions of which are enlarged to form loops, a series of separate individual cutters adapted to travel in said narrow passage and being disposed in two oppositely-moving runs one above the other and in direct contact with each other, so that the edges of the cutters move directly past each other to perform the cutting, and means situate in said loops by which to push the cutters continuously through the casing.

MARK N. CORMACK.

Witnesses:
THEO. G. HOSTER,
EVERARD BOLTON MARSHALL.